US010180526B2

(12) United States Patent
Pao et al.

(10) Patent No.: US 10,180,526 B2
(45) Date of Patent: Jan. 15, 2019

(54) FRONT LIGHT MODULE AND DISPLAY DEVICE

(71) Applicant: E Ink Holdings Inc., Hsinchu (TW)

(72) Inventors: Yu-Nan Pao, Hsinchu (TW); Chia-Chuang Hu, Hsinchu (TW); I-Jeng Chen, Hsinchu (TW); Chin-Ju Hsu, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 361 days.

(21) Appl. No.: 14/639,126

(22) Filed: Mar. 5, 2015

(65) Prior Publication Data

US 2015/0338565 A1 Nov. 26, 2015

(30) Foreign Application Priority Data

May 26, 2014 (TW) .............................. 103118290 A

(51) Int. Cl.
*F21V 8/00* (2006.01)
(52) U.S. Cl.
CPC .......... *G02B 6/0036* (2013.01); *G02B 6/0061* (2013.01); *G02B 6/0093* (2013.01)
(58) Field of Classification Search
None
See application file for complete search history.

(56) References Cited

U.S. PATENT DOCUMENTS

| 2001/0028419 A1 | 10/2001 | Fukiharu |
| 2002/0005824 A1 | 1/2002 | Oshitani |
| 2007/0139965 A1* | 6/2007 | Liao ..................... G02B 6/0036 362/615 |

(Continued)

FOREIGN PATENT DOCUMENTS

| CN | 1543549 | 11/2004 |
| TW | 201232068 | 8/2012 |

(Continued)

OTHER PUBLICATIONS

"Office Action of Taiwan Counterpart Application", dated Apr. 27, 2015, p. 1-p. 8, in which the listed references were cited.

(Continued)

*Primary Examiner* — Britt D Hanley
(74) *Attorney, Agent, or Firm* — JCIPRNET

(57) ABSTRACT

A front light module including a light guide plate, a light source, a transparent cover lens and an annular connecting unit is provided. The light guide plate includes a first surface, a plurality of micro-structure groups, a second surface and a light entering surface. The first surface includes a first area and a second area surrounding the first area. The micro-structure groups are disposed on the first surface and within the first area. The micro-structure groups have a plurality of adjacent micro-structures, and the micro-structures groups are separate from each other. The light entering surface connects the first surface and the second surface. The light source is disposed beside the light entering surface. The annular connecting unit connects the second area of the first surface and the transparent cover lens, and keeps a gap between the micro-structure groups and the transparent cover lens. A display device is also provided.

20 Claims, 5 Drawing Sheets

(56) References Cited

U.S. PATENT DOCUMENTS

| | | | |
|---|---|---|---|
| 2008/0186739 A1* | 8/2008 | Chen | F21V 7/22 362/620 |
| 2012/0188792 A1* | 7/2012 | Matsumoto | G02B 6/0036 362/613 |
| 2012/0275190 A1* | 11/2012 | Matsumoto | G02B 6/0036 362/609 |
| 2012/0281430 A1* | 11/2012 | Huang | G02B 6/0061 362/603 |
| 2013/0176317 A1 | 7/2013 | Li | |
| 2013/0257880 A1 | 10/2013 | Li et al. | |
| 2014/0104885 A1* | 4/2014 | Zhang | G02B 6/0036 362/626 |
| 2015/0003104 A1* | 1/2015 | Huang | G02B 6/005 362/606 |

FOREIGN PATENT DOCUMENTS

| | | |
|---|---|---|
| TW | 201333560 | 8/2013 |
| TW | 201411243 | 3/2014 |
| WO | 2013028467 | 2/2013 |

OTHER PUBLICATIONS

"Office Action of China Counterpart Application," dated Dec. 19, 2017, p. 1-p. 11.

\* cited by examiner

FRONT LIGHT MODULE AND DISPLAY DEVICE

CROSS-REFERENCE TO RELATED APPLICATION

This application claims the priority benefit of Taiwan application serial no. 103118290, filed on May 26, 2014. The entirety of the above-mentioned patent application is hereby incorporated by reference herein and made a part of this specification.

BACKGROUND OF THE INVENTION

1. Field of the Invention

The invention relates to an optical module and a display device, and particularly relates to a front light module and a display device.

2. Description of Related Art

In the current color display technologies for color electronic readers, a color filter is disposed on a reflective display panel. The reflective display panel includes a plurality of electrophoretic ink capsules. The color filter includes a plurality of sub-pixel regions having different colors (e.g., red, green, and blue). By controlling gray-scale variation of the electrophoretic ink capsules under different sub-pixel regions, the color electronic reader is capable of producing an image effect of full-color.

Since the sub-pixel regions of the color filter absorb light at a portion of the wavelength of the white light to display a color at the remaining wavelength, and the ambient light or the light from a front light module needs to pass through the color filter back and forth, the color filter significantly reduces the efficiency of energy usage, making the image of the color electronic reader less bright than that of the black-and-white electronic reader in general. Therefore, compared with the black-and-white electronic reader, the luminance provided by the front light module of the color electronic reader needs to be further improved to provide a preferable overall image contrast and quality.

SUMMARY OF THE INVENTION

The embodiments of the invention provide a front light module capable of increasing luminance and an overall contrast of a display image.

The embodiments of the invention provide a display device having preferable luminance of a display image, overall contrast, and color saturation.

An embodiment of the invention provides a front light module including a light guide plate, a light source, a transparent cover, and an annular connecting unit. The light guide plate includes a first surface, a plurality of micro-structure groups, a second surface, and a light entering surface. The first surface includes a first region and a second region surrounding the first region. The plurality of micro-structure groups are disposed on the first surface and located within the first region. Each of the micro-structure groups has a plurality of adjacent micro-structures, and the micro-structure groups are separated from each other. The second surface is opposite to the first surface, and the light entering surface connects the first surface and the second surface. The light source is disposed beside the light entering surface, and the light source is configured to illuminate the light guide plate. The annular connecting unit connects the second region of the first surface and the transparent cover, and keeps a gap between the micro-structure groups and the transparent cover.

An embodiment of the invention provides a display device, including a reflective display panel, the light guide plate, the light source, the transparent cover, and the annular connecting unit. The light guide plate is disposed on the reflective display panel. The first surface of the light guide plate faces away from the reflective display panel, and the second surface of the light guide plate faces toward the reflective display panel.

According to an embodiment of the invention, at least one of the micro-structures includes a first optical surface facing toward the light entering surface, a second optical surface facing away from the light entering surface, and a third optical surface connecting the first optical surface and the second optical surface. In addition, the third optical surface faces away from the first surface.

According to an embodiment of the invention, an inclined angle of the second optical surface with respect to the normal line of the light entering surface ranges from 30 degrees to 50 degrees.

According to an embodiment of the invention, an inclined angle of the first optical surface with respect to the normal line of the light entering surface is greater than 80 degrees and less than or equal to 90 degrees.

According to an embodiment of the invention, the micro-structures of at least one of the micro-structure groups are arranged along a direction, and in two adjacent micro-structures, the first optical surface of one of the two adjacent micro-structures is adjacent to the second optical surface of the other of the two adjacent micro-structures.

According to an embodiment of the invention, the direction is substantially perpendicular to the light entering surface.

According to an embodiment of the invention, the annular connecting unit is annular glue.

According to an embodiment of the invention, a length of a long side and a length of a short side of at least one of the micro-structure groups in a direction substantially parallel to the second surface are less than 200 micrometers respectively.

According to an embodiment of the invention, a gap between any two adjacent micro-structures of at least one of the micro-structure groups is less than or equal to one third of a width of the third optical surface.

According to an embodiment of the invention, a width of the third optical surface of at least one of the micro-structures is less than or equal to a height of the micro-structure.

According to an embodiment of the invention, the micro-structure groups have the same or different numbers of the micro-structures.

Based on the above, the front light module provided in the embodiments of the invention is capable of making the light from the light source be emitted from the second surface more efficiently by using the micro-structure groups and the gap between the micro-structure groups and the transparent cover. The display device provided in the embodiments of the invention is capable of providing more light from the light source to effectively illuminate the reflective display panel by using the micro-structure groups and the gap between the micro-structure groups and the transparent cover, so as to improve the quality of the display image provided by the display device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
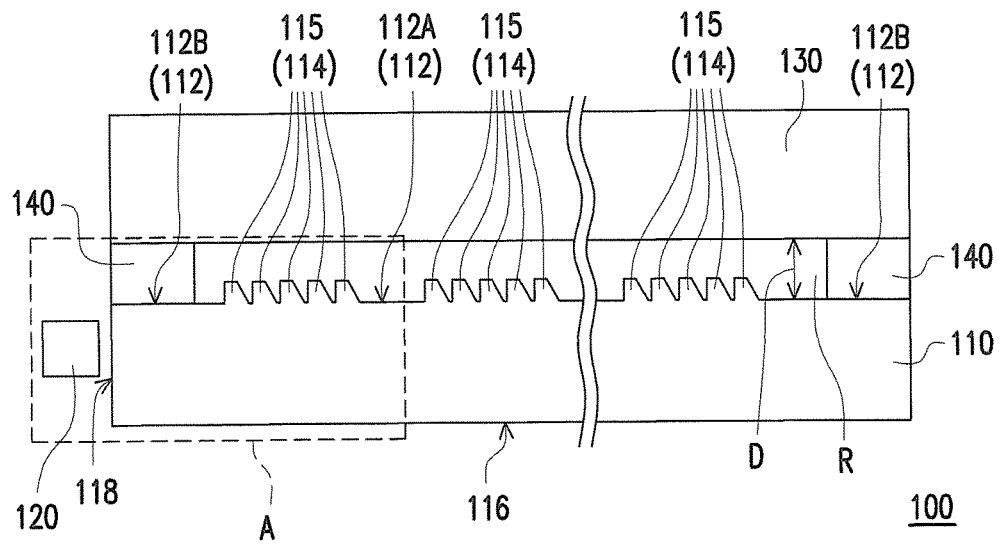
FIG. 1 is a cross-sectional view of a front light module according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
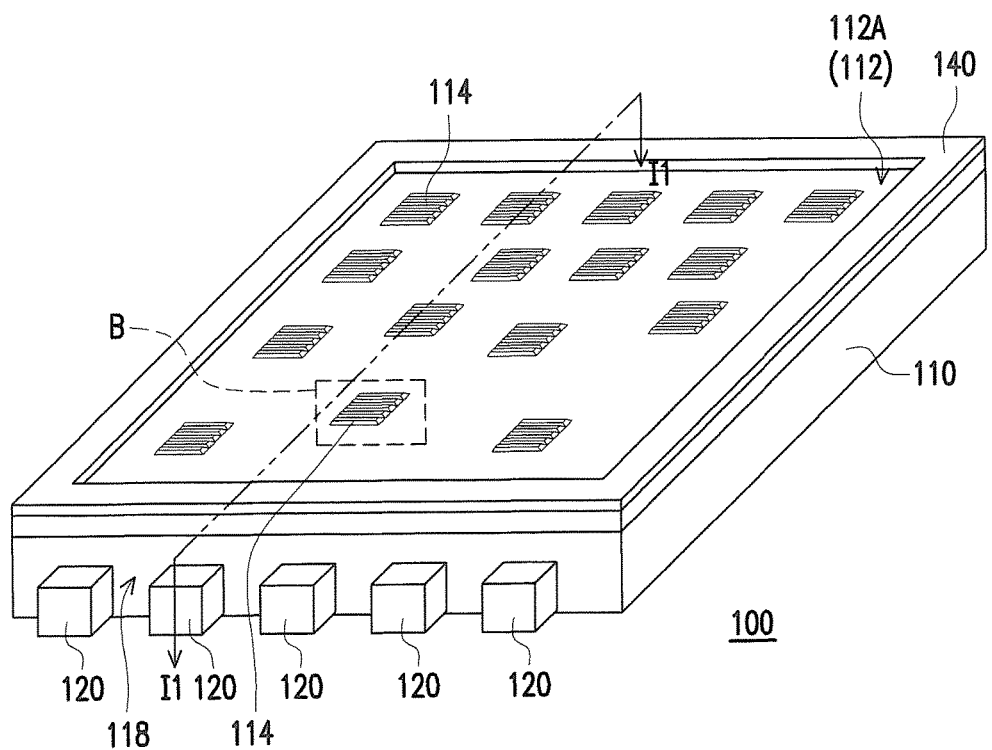
FIG. 2 is a partial perspective view of the front light module according to the first embodiment of the invention.

To clearly illustrate the embodiments of the invention described in the following, micro-structures in the accompanying drawings are enlarged to clearly describe the structure thereof without limiting a relation of sizes of the micro-structures. FIG. 1 is a cross-sectional view of a front light module according to a first embodiment of the invention. FIG. 2 is a partial perspective view of the front light module according to the first embodiment of the invention. It should be noted that for the purpose of clear illustration, the perspective view of the front light module according to an embodiment of the invention shown in FIG. 2 omits a transparent cover, and FIG. 1 is a cross-sectional view along a line I1-I1 of FIG. 2, for example. Referring to FIGS. 1 and 2, a front light module 100 of the first embodiment of the invention includes a light guide plate 110, a light source 120, a transparent cover 130, and an annular connecting unit 140. The light guide plate 110 includes a first surface 112, a plurality of micro-structure groups 114, a second surface 116, and a light entering surface 118. The first surface 112 includes a first region 112A and a second region 112B surrounding the first region 112A. The micro-structure groups 114 are disposed on the first surface 112 and located within the first region 112A. Each of the micro-structure groups 114 has a plurality of adjacent micro-structures 115 (five micro-structures in this embodiment, for example), and the micro-structure groups 114 are separated from each other. The second surface 116 is opposite to the first surface 112, and the light entering surface 118 connects the first surface 112 and the second surface 116. The light source 120 is disposed beside the light entering surface 118, and the light source 120 is configured to illuminate the light guide plate 110. The annular connecting unit 140 connects the second region 112B of the first surface 112 and the transparent cover 130, and keeps a gap D between the micro-structure groups 114 and the transparent cover 130.

Specifically, referring to FIG. 2, the micro-structure groups 114 in the first embodiment of the invention are distributed more densely on the first surface 112 away from the light entering surface 118 than on the first surface 112 close to the light entering surface 118. In other words, the micro-structure groups 114 are in an arrangement of becoming from sparse to dense from one side close to the light entering surface 118 to one side away from the light entering surface 118.

More specifically, referring to FIG. 1, the annular connecting unit 140, the first surface 112, and the transparent cover 130 form a space R in the first embodiment of the invention. In addition, the space R contains air, for example. Therefore, there is a greater difference in refractive indices between the material of the light guide plate 110 and the air in the space R. When light beam emitted to the micro-structure 115 on the first surface 112 after entering the light entering surface 118, most of light beam may be transmitted toward the second surface 116 through total internal reflected of the micro-structure 115, and the others emitted out of the micro-structure 115 may enter the adjacent micro-structure 115 and is transmitted toward the second surface 116 through total internal reflection of the micro-structures 115. In this embodiment, a material of the transparent cover 130 may be glass, for example. However, the invention is not limited thereto. In other embodiments, the material of the transparent cover may also be plastic materials such as polycarbonate (PC), polymethyl methacrylate (PMMA), etc., or plastic composite materials, for example. In this embodiment, the light source 120 is a light emitting diode (LED), for example. However, the invention is not limited thereto. In other embodiments, the light source may also be an organic light emitting diode (OLED) or other elements suitable for emitting light.

Figure 3A:
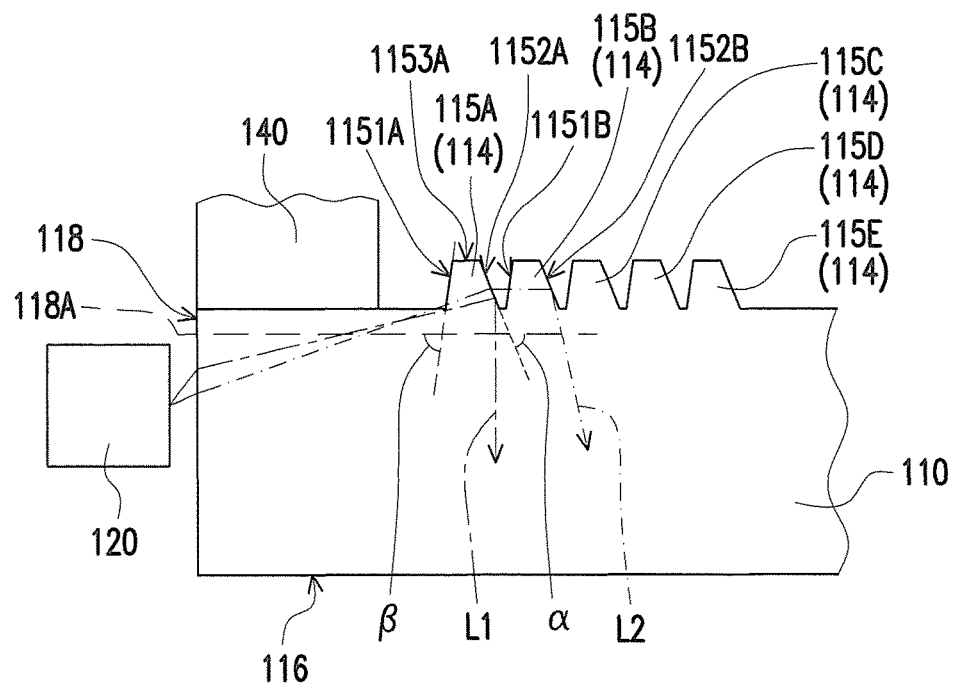
FIG. 3A is an enlarged view of a region A of FIG. 1.

FIG. 3A is an enlarged view of a region A of FIG. 1. Specifically, referring to FIGS. 1 and 3A together, a micro-structure (e.g., a micro-structure 115A) in the micro-structure groups 114 in the first embodiment of the invention includes a first optical surface 1151A facing toward the light entering surface 118, a second optical surface 1152A facing away from the light entering surface 118, and a third optical surface 1153A connecting the first optical surface 1151A and the second optical surface 1152A. In addition, the third optical surface 1153A faces away from the first surface 112. In this embodiment, surface configurations of other micro-structures such as micro-structures 115B to 115E are the same as that of the micro-structure 115A. Therefore, details about the surface configurations of other micro-structures will not be reiterated below. Specifically, referring to FIGS. 1 and 3A together, in the first embodiment of the invention, a light beam L1 is reflected by the second optical surface 1152A to be transmitted toward the second surface 116 after the light beam L1 from the light source 120, for example, is transmitted to the second optical surface 1152A. In addition, from the perspective of the second surface 116, the reflected light beam L1 may arrive at the second surface 116 at an incident angle equal or close to 0 degrees, for example. In this embodiment, a light beam L2 from the light source 120, for example, is emitted out of the second optical surface 1152A and then enters a first optical surface 1151B. Then, the light beam L2 is reflected by a second optical surface 1152B to be transmitted toward the second surface 116. Moreover, from the perspective of the second surface 116, the reflected light beam L2 may arrive at the second surface 116 at an incident angle equal or close to 15 degrees, for example. In this embodiment, a light beam passing through the micro-structure 115E may be transmitted toward the first surface 112 after being emitted out of the second optical surface of the micro-structure 115E, enter the light guide plate 110, and arrive at the second surface 116. In addition, the light beam arrives at the second surface 116 at an incident angle equal or close to 40 degrees, for example. In other words, the plurality of micro-structures 115 in the micro-structure groups 114 allow more light beams from the light source 120 to be transmitted toward the second surface 116 in a more collimated manner, thereby providing preferable illumination.

Figure 3B:
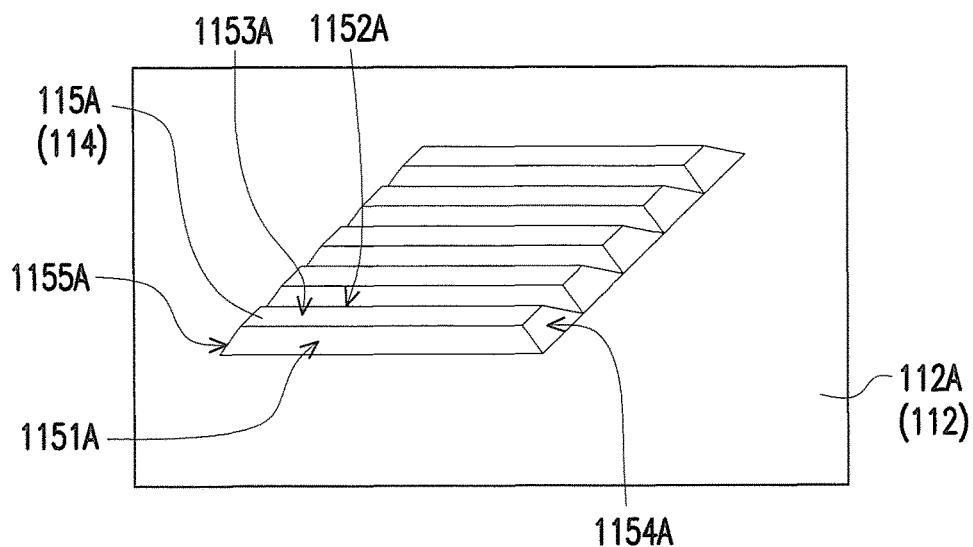
FIG. 3B is an enlarged view of a region B of FIG. 2.

FIG. 3B is an enlarged view of a region B of FIG. 2. Specifically, referring to FIG. 3B, a micro-structure (e.g., the micro-structure 115A) of the micro-structure groups 114 according to the first embodiment of the invention further includes two side surfaces 1154A and 1155A. The side surfaces 1154A and 1155A are respectively connected to the first optical surface 1151A, the second optical surface 1152A, and the third optical surface 1153A. In addition, the side surface 1154A and the side surface 1155A are disposed to be inclined, thereby making upper edges of the first optical surface 1151A and the second optical surface 1152A connecting the third optical surface 1153A shorter than lower edges of the first optical surface 1151A and the second optical surface 1152A. In this embodiment, the micro-structure groups 114 are manufactured by using a mold, for example. However, the invention is not limited thereto. In other embodiments, the micro-structure groups may be manufactured by etching the light guide plate.

Figure 4:
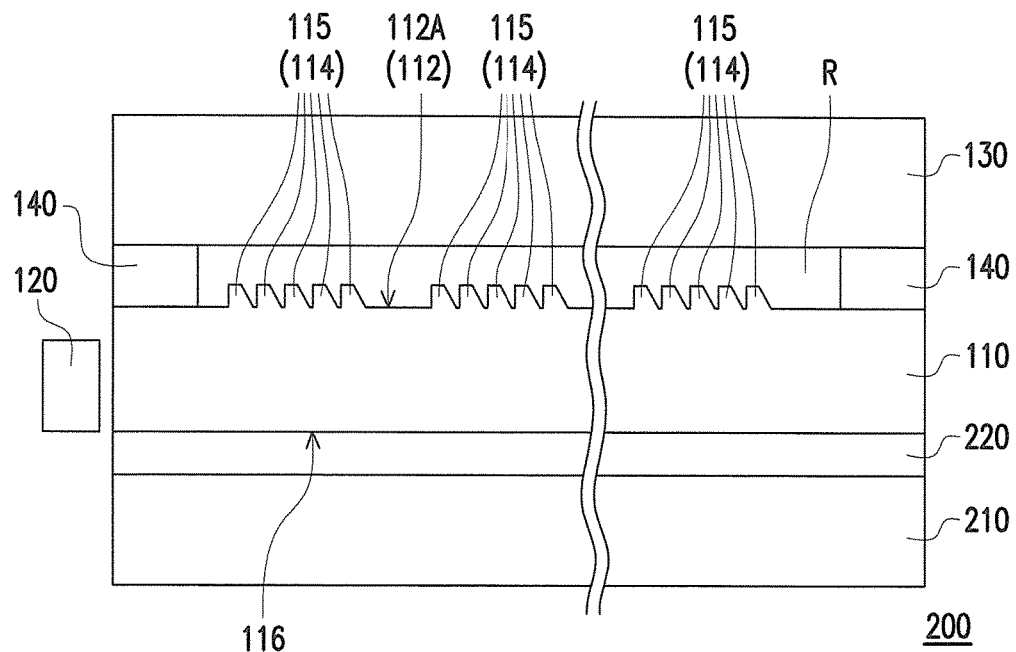
FIG. 4 is a cross-sectional view of a display device according to a second embodiment of the invention.

FIG. 4 is a cross-sectional view of a display device according to a second embodiment of the invention. Referring to FIG. 4, according to the second embodiment of the invention, a display device 200 includes a reflective display panel 210, the light guide plate 110, the light source 120, the transparent cover 130, and the annular connecting unit 140. In this embodiment, the configuration of the light guide plate 110, the light source 120, the transparent cover 130 and the annular connecting unit 140 are the same as the configuration in the front light module 100 according to the first embodiment of the invention. Therefore, no further details in this respect will be reiterated below. In addition, the light guide plate 110 is disposed on the reflective display panel 210, the first surface 112 of the light guide plate 110 faces away from the reflective display panel 210, and the second surface 116 of the light guide plate 110 faces toward the reflective display panel 210. In other words, the difference in refractive indices between the material of the light guide plate 110 and the air in the space R and the micro-structure groups 114 allow more light beams from the light source 120 to be emitted out of the second surface 116 to effectively illuminate the reflective display panel 210, thereby improving a display image quality of the display device 200.

Referring to FIG. 4, in the second embodiment of the invention, the display device 200 further includes an optical clear adhesive (OCA) layer 220 disposed between the light guide plate 110 and the reflective display panel 210. In other embodiments, the display device may include an anti-reflective layer or a low-reflection layer, and the anti-reflective layer or the low-reflection layer may be disposed on a surface of the transparent cover 130 facing the light guide plate 110 or facing away from the light guide plate 110 by adhesion or coating. In other embodiments, the display device may further include an ultraviolet (UV) cut layer (e.g., a UV-CUT sheet or a UV-CUT film) disposed on the surface of the transparent cover 130 facing the light guide plate 110 or facing away from the light guide plate 110. Alternatively, the display device may include a UV-CUT material doped in the transparent cover 130.

Specifically, referring to FIGS. 4 and 3A, in the second embodiment of the invention, an inclined angle α of the second optical surface (e.g., the second optical surface 1152A) with respect to the normal line 118A of the light entering surface 118 ranges from 30 degrees to 50 degrees. However, the invention is not limited thereto. In this embodiment, an inclined angle β of the first optical surface (e.g., the first optical surface 1151A) with respect to the normal line 118A of the light entering surface 118 is greater than 80 degrees and less than or equal to 90 degrees. However, the invention is not limited thereto.

Figure 5:
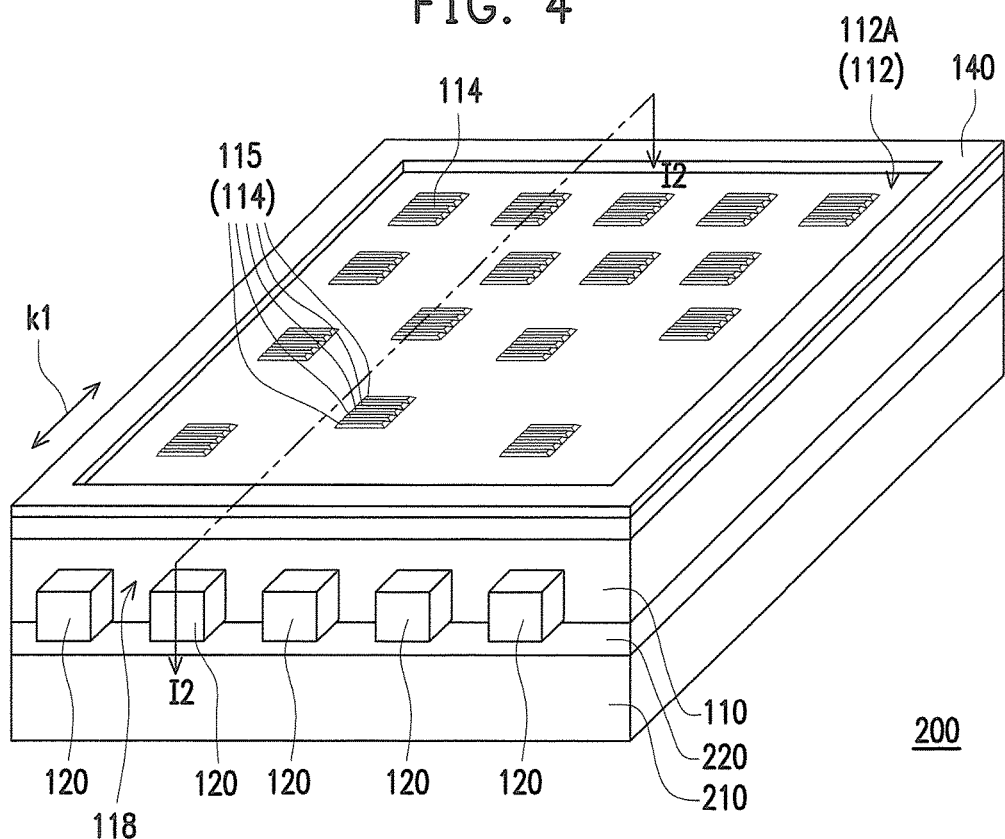
FIG. 5 is a partial perspective view of the display device according to the second embodiment of the invention.

FIG. 5 is a partial perspective view of the display device according to the second embodiment of the invention. It should be noted that for the purpose of clear illustration, the perspective view of the front light module according to an embodiment of the invention shown in FIG. 5 omits a transparent cover, and FIG. 4 is a cross-sectional view along a line I2-I2 of FIG. 5. More specifically, referring to FIGS. 3A and 5, the micro-structures 115 of the micro-structure groups 114 in the second embodiment of the invention are arranged along a direction k1. In addition, in two adjacent micro-structures 115, such as the micro-structures 115A and 115B, the first optical surface 1151B of the micro-structure 115B and the second optical surface 1152A of the micro-structure 115A are adjacent. However, the invention is not limited thereto. Moreover, in this embodiment, the direction k1 is substantially perpendicular to the light entering surface 118.

Figure 6:
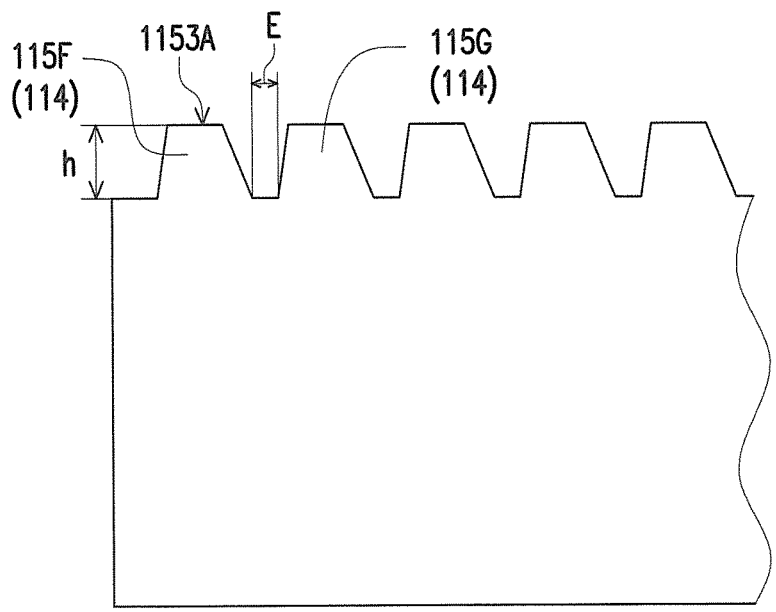
FIG. 6 is a partial cross-sectional view of a light guide plate according to another embodiment of the invention.

FIG. 6 is a partial cross-sectional view of a light guide plate according to another embodiment of the invention. Referring to FIG. 6, in another embodiment of the invention, a gap E between any two adjacent micro-structures 115 of the micro-structure groups 114 (e.g., micro-structures 115F and 115G) is less than or equal to one third of a width of the third optical surface 1153A. In addition, the width of the third optical surface 1153A of the micro-structure 115F (or the micro-structure 115G) is less than or equal to a height h of the micro-structure 115F (or the micro-structure 115G).

Referring to FIG. 5, in the second embodiment of the invention, the annular connecting unit 140 is annular glue, for example. However, the invention is not limited thereto.

Figure 7:
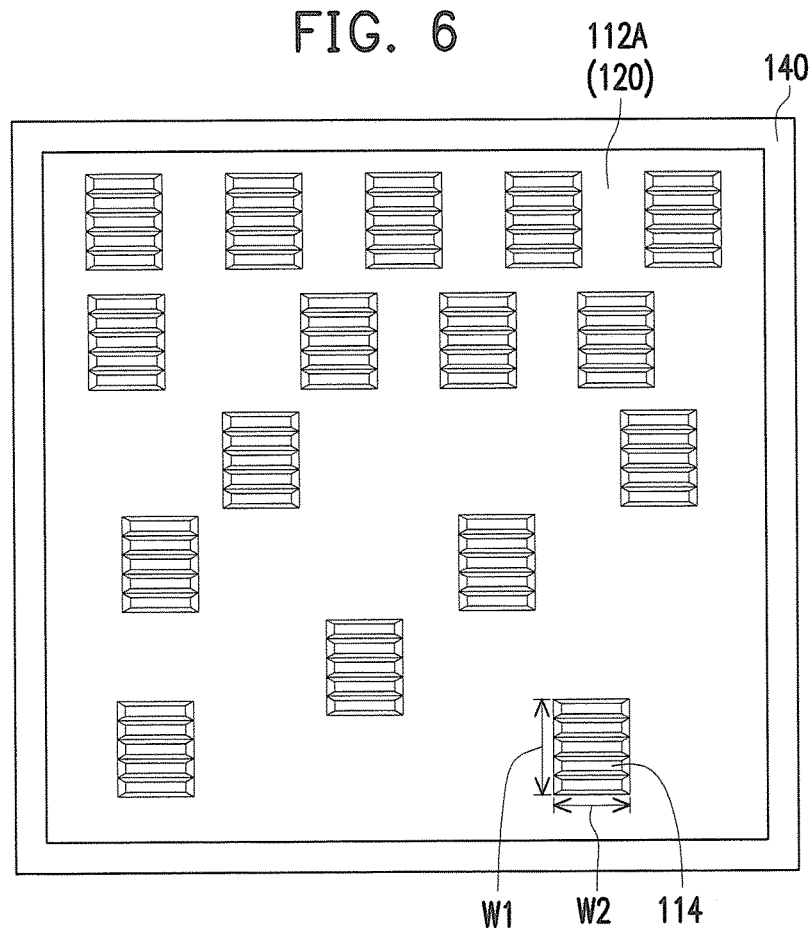
FIG. 7 is a top view of a light guide plate according to another embodiment of the invention.

FIG. 7 is a top view of a light guide plate according to another embodiment of the invention. Referring to FIGS. 4 and 7 together, in another embodiment of the invention, the micro-structure groups 114 on the first surface 112 are in a configuration similar to the micro-structure groups 114 of the embodiments described above, and a length W1 of a long side and a length W2 of a short side of the micro-structure groups 114 in a direction substantially parallel to the first surface 112 are less than 200 micrometers respectively.

Figure 8:
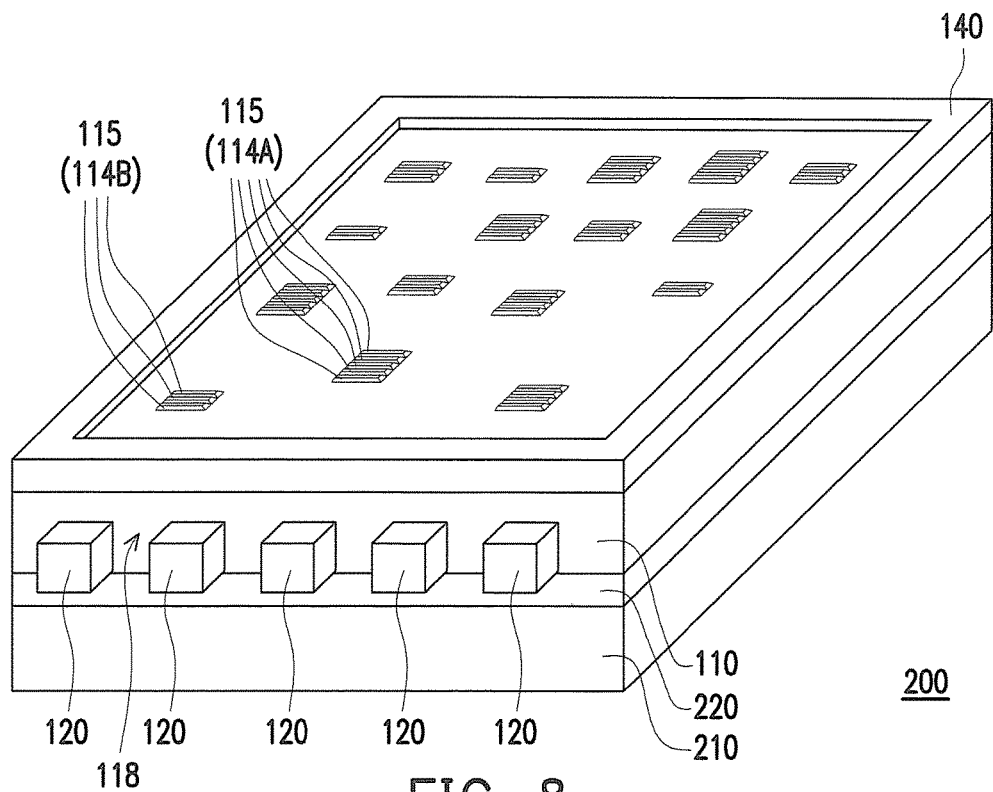
FIG. 8 is a partial perspective view of a display device according to another embodiment of the invention.

FIG. 8 is a partial perspective view of a display device according to another embodiment of the invention. Referring to FIG. 5, in the second embodiment of the invention, the micro-structure groups 114 respectively have the same number (e.g., five) of the micro-structures 115. However, the invention is not limited thereto. Referring to FIG. 8, in another embodiment of the invention, the micro-structure groups 114 have different numbers of the micro-structures 115. More specifically, referring to FIG. 8, a micro-structure group 114A has five micro-structures 115, while a micro-structure group 114B has three micro-structures 115 in this embodiment.

It should be noted that in the embodiments shown in FIGS. 1 to 8, the technical features about the micro-structure groups 114 and the micro-structures 115 may be shared by all the micro-structure groups 114 and the micro-structures 115. However, the invention is not limited thereto. In other embodiments, a part of the micro-structure groups 114 and the micro-structures 115 included by the light guide plate 110 may have one of the technical features about the micro-structure groups 114 and the micro-structures 115 or a combination of the technical features.

Figure 9:
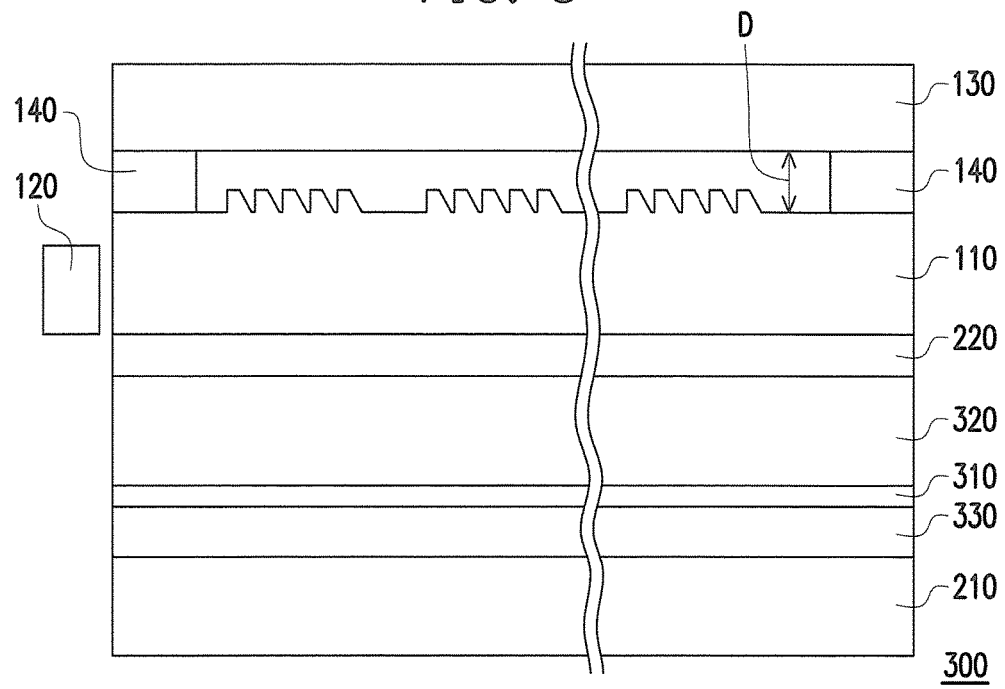
FIG. 9 is a cross-sectional view of a display device according to another embodiment of the invention.

FIG. 9 is a cross-sectional view of a display device according to another embodiment of the invention. Referring to FIG. 9, in another embodiment of the invention, a display device 300 is similar to the display device 200 in the second embodiment of the invention. Referring to FIG. 4, the display device 300 differs from the display device 200 in that the display device 300 further includes a color filter 310, a substrate 320, and an optical adhesive layer 330. More specifically, the display device 300 of this embodiment is a color electronic reader, for example. In this embodiment, the gap D between the micro-structure groups 114 and the transparent cover 130 and the micro-structure groups 114 allow a color display image displayed by the display device 300 to have a higher luminance and contrast, thereby improving a quality of the display image. More specifically, the reflective display panel 210 of this embodiment may be a color display panel. In addition, since light provided by the front light module has a smaller divergence angle, it is possible to prevent the light emitted by the front light module from passing through two sub-pixel regions with different colors of the color filter 310 when the light is reflected by the reflective display panel 210 back to the front light module as much as possible. In other words, through the light guide plate 110, the light beams emitted by the light source 120 are capable of passing through the second surface in a more collimated manner and illuminating the reflective display panel 210.

In view of the foregoing, in the front light module provided by the embodiments of the invention, the difference in refractive indices between the air in the gap kept between the micro-structure groups and the transparent cover and the material of the light guide plate as well as the micro-structure groups allow the light from the light source to be reflected more easily after being emitted to the first surface, making the light beam emitted out of the second surface more efficiently. In the display device provided in the embodiments of the invention, the difference in refractive indices between the air in the gap kept between the micro-structure groups and the transparent cover and the light guide plate as well as the micro-structure groups allow the light from the light source to be reflected more easily after being emitted to the first surface and allow more light form the light source to effectively illuminate the reflective display panel through the light guide plate, thereby increasing the display image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A front light module, comprising:
a light guide plate, comprising:
a first surface, comprising a first region and a second region surrounding the first region;
a plurality of micro-structure groups, disposed on the first surface and located within the first region, wherein each of the micro-structure groups has a plurality of adjacent micro-structures, and the micro-structure groups are separated from each other;
a second surface, opposite to the first surface; and
a light entering surface, connecting the first surface and the second surface;
a light source, disposed beside the light entering surface, wherein the light source is configured to illuminate the light guide plate;
a transparent cover; and
a ring-shaped connecting unit, connecting the second region of the first surface and the transparent cover and keeping a gap between the micro-structure groups and the transparent cover, wherein the ring-shaped connecting unit, the first surface, and the transparent cover form a space inside the ring-shaped connecting unit, and the micro-structure groups are disposed in the space, the second region of the first surface directly connects with the light entering surface, and the micro-structure groups protrude with respect to the second region of the first surface and protrude into the space.

2. The front light module as claimed in claim 1, wherein at least one of the micro-structures comprises a first optical surface facing toward the light entering surface, a second optical surface facing away from the light entering surface, and a third optical surface connecting the first optical surface and the second optical surface, the third optical surface facing away from the first surface.

3. The front light module as claimed in claim 2, wherein an inclined angle of the second optical surface with respect to the normal line of the light entering surface ranges from 30 degrees to 50 degrees.

4. The front light module as claimed in claim 2, wherein an inclined angle of the first optical surface with respect to the normal line of the light entering surface is greater than 80 degrees and less than or equal to 90 degrees.

5. The front light module as claimed in claim 2, wherein a gap between any two adjacent micro-structures of at least one of the micro-structure groups is less than or equal to one third of a width of the third optical surface.

6. The front light module as claimed in claim 2, wherein a width of the third optical surface of at least one of the micro-structures is less than or equal to a height of the micro-structure.

7. The front light module as claimed in claim 2, wherein the micro-structures of at least one of the micro-structure groups are arranged along a direction, and in two adjacent micro-structures, the first optical surface of one of the two adjacent micro-structures is adjacent to the second optical surface of the other of the two adjacent micro-structures.

8. The front light module as claimed in claim 7, wherein the direction is substantially perpendicular to the light entering surface.

9. The front light module as claimed in claim 1, wherein the ring-shaped connecting unit is ring-shaped glue.

10. The front light module as claimed in claim 1, wherein a length of a long side and a length of a short side of at least one of the micro-structure groups in a direction substantially parallel to the first surface are less than 200 micrometers respectively.

11. A display device, comprising:
a reflective display panel;
a light guide plate, disposed on the reflective display panel, the light guide plate comprising:
  a first surface, facing away from the reflective display panel and comprising a first region and a second region surrounding the first region;
  a plurality of micro-structure groups, disposed on the first surface and located within the first region, wherein each of the micro-structure groups has a plurality of adjacent micro-structures, and the micro-structure groups are separated from each other;
  a second surface, opposite to the first surface and facing toward the reflective display panel; and
  a light entering surface, connecting the first surface and the second surface;
a light source, disposed beside the light entering surface, wherein the light source is configured to illuminate the light guide plate;
a transparent cover; and
a ring-shaped connecting unit, connecting the second region of the first surface and the transparent cover and keeping a gap between the micro-structure groups and the transparent cover, wherein the ring-shaped connecting unit, the first surface, and the transparent cover form a space inside the ring-shaped connecting unit, and the micro-structure groups are disposed in the space, the second region of the first surface directly connects with the light entering surface, and the micro-structure groups protrude with respect to the second region of the first surface and protrude into the space.

12. The display device as claimed in claim 11, wherein at least one of the micro-structures comprises a first optical surface facing toward the light entering surface, a second optical surface facing away from the light entering surface, and a third optical surface connecting the first optical surface and the second optical surface, the third optical surface facing away from the first surface.

13. The display device as claimed in claim 12, wherein an inclined angle of the second optical surface with respect to the normal line of the light entering surface ranges from 30 degrees to 50 degrees.

14. The display device as claimed in claim 12, wherein an inclined angle of the first optical surface with respect to the normal line of the light entering surface is greater than 80 degrees and less than or equal to 90 degrees.

15. The display device as claimed in claim 12, wherein a gap between any two adjacent micro-structures of at least one of the micro-structure groups is less than or equal to one third of a width of the third optical surface.

16. The display device as claimed in claim 12, wherein a width of the third optical surface of at least one of the micro-structures is less than or equal to a height of the micro-structure.

17. The display device as claimed in claim 12, wherein the micro-structures of at least one of the micro-structure groups are arranged along a direction, and in two adjacent micro-structures, the first optical surface of one of the two adjacent micro-structures is adjacent to the second optical surface of the other of the two adjacent micro-structures.

18. The display device as claimed in claim 17, wherein the direction is substantially perpendicular to the light entering surface.

19. The display device as claimed in claim 11, wherein the ring-shaped connecting unit is ring-shaped glue.

20. The display device as claimed in claim 11, wherein a length of a long side and a length of a short side of at least one of the micro-structure groups in a direction substantially parallel to the first surface are less than 200 micrometers respectively.

* * * * *